United States Patent
Kim et al.

(10) Patent No.: US 9,137,632 B2
(45) Date of Patent: Sep. 15, 2015

(54) METHOD OF SETTING INITIAL LOCATION OF USER TERMINAL VIA INTERACTION WITH USER AND USER TERMINAL

(71) Applicant: SAMSUNG ELECTRONICS CO., LTD., Suwon-si (KR)

(72) Inventors: Seong Eun Kim, Suwon-si (KR); Yong Kim, Seoul (KR); Eung Sun Kim, Suwon-si (KR); Hyun Gi Ahn, Incheon (KR); Ji Hyun Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 14/058,532

(22) Filed: Oct. 21, 2013

(65) Prior Publication Data
US 2014/0113664 A1    Apr. 24, 2014

(30) Foreign Application Priority Data
Oct. 23, 2012    (KR) .......................... 10-2012-0117581

(51) Int. Cl.
*H04W 4/02* (2009.01)
*H04M 1/00* (2006.01)
*H04W 4/00* (2009.01)

(52) U.S. Cl.
CPC *H04W 4/02* (2013.01); *H04M 1/00* (2013.01); *H04W 4/006* (2013.01)

(58) Field of Classification Search
CPC ..... H04W 4/02; H04W 4/006; H08B 13/2451
USPC ........ 455/457, 517, 414.1; 345/660; 705/26.9
See application file for complete search history.

(56) References Cited

U.S. PATENT DOCUMENTS

| | | | |
|---|---|---|---|
| 2004/0167714 A1* | 8/2004 | Macphail | 701/213 |
| 2009/0055094 A1 | 2/2009 | Suzuki | |
| 2012/0072106 A1 | 3/2012 | Han et al. | |
| 2013/0191246 A1* | 7/2013 | Calman et al. | 705/26.9 |

FOREIGN PATENT DOCUMENTS

| | | |
|---|---|---|
| JP | 2008-224344 A | 9/2008 |
| KR | 10-2006-0091455 A | 8/2006 |

* cited by examiner

*Primary Examiner* — Phuoc H Doan
(74) *Attorney, Agent, or Firm* — NSIP Law

(57) ABSTRACT

A method of setting an initial location of a user terminal via an interaction with a user and a user terminal is provided. The method includes measuring a magnetic field at a current location of the user terminal, and estimating a candidate initial location of the user terminal based on the magnetic field. The method further includes displaying the candidate initial location, and selecting the candidate initial location. The method further includes setting the initial location based on the selection.

20 Claims, 5 Drawing Sheets

METHOD OF SETTING INITIAL LOCATION OF USER TERMINAL VIA INTERACTION WITH USER AND USER TERMINAL

CROSS-REFERENCE TO RELATED APPLICATION

This application claims the benefit under 35 U.S.C. §119 (a) of Korean Patent Application No. 10-2012-0117581, filed on Oct. 23, 2012, in the Korean Intellectual Property Office, the entire disclosure of which is incorporated herein by reference for all purposes.

BACKGROUND

1. Field

The following description relates to a method of setting an initial location of a user terminal via an interaction with a user and a user terminal.

2. Description of Related Art

In a method of estimating a location, using mobile communication signals, triangulation of a mobile terminal capable of mobile communication may be performed by employing a proximity scheme of approximating a location of the mobile terminal using a location of a cell base station to which the mobile terminal is connected. Alternatively, triangulation of a mobile terminal may be performed by measuring times of arrival (TOAs) of signals from at least three proximate base stations, respectively.

In a method of estimating a location, using a local area network (LAN), a location of a LAN terminal may be estimated by employing a proximity scheme of approximating the location of the LAN terminal, using a location of an access point (AP) to which the LAN terminal belongs. Alternatively, a location of a LAN terminal may be estimated by measuring a signal intensity at a proximate AP, and performing pattern matching with a fingerprint map previously-recorded.

In a method of estimating a location, using an ultra-wide band (UWB) communication, triangulation of a terminal may be performed by measuring a distance to an AP generating a UWB signal.

In a method of estimating a location, using a magnetic field map, a location of a terminal may be calculated by measuring a magnetic field at the location of the terminal. Representative algorithms that estimate a location of a terminal through a calculation may include a Kalman filter, a particle filter, and a Markov localization. The aforementioned algorithms may be used to measure environmental variables that change in various manners when the terminal moves, and to estimate the location of the terminal, using a result of the measuring.

SUMMARY

In one general aspect, there is provided a method of setting an initial location of a user terminal, the method including measuring a magnetic field at a current location of the user terminal, and estimating a candidate initial location of the user terminal based on the magnetic field. The method further includes displaying the candidate initial location, and selecting the candidate initial location. The method further includes setting the initial location based on the selection.

In another general aspect, there is provided a user terminal including a measuring unit configured to measure a magnetic field at a current location of the user terminal, and a processor configured to estimate a candidate initial location of the user terminal based on the magnetic field. The user terminal further includes a display unit configured to display the candidate initial location. The processor is further configured to select the candidate initial location, and set the initial location based on the selection.

Other features and aspects will be apparent from the following detailed description, the drawings, and the claims.

Figure 1:
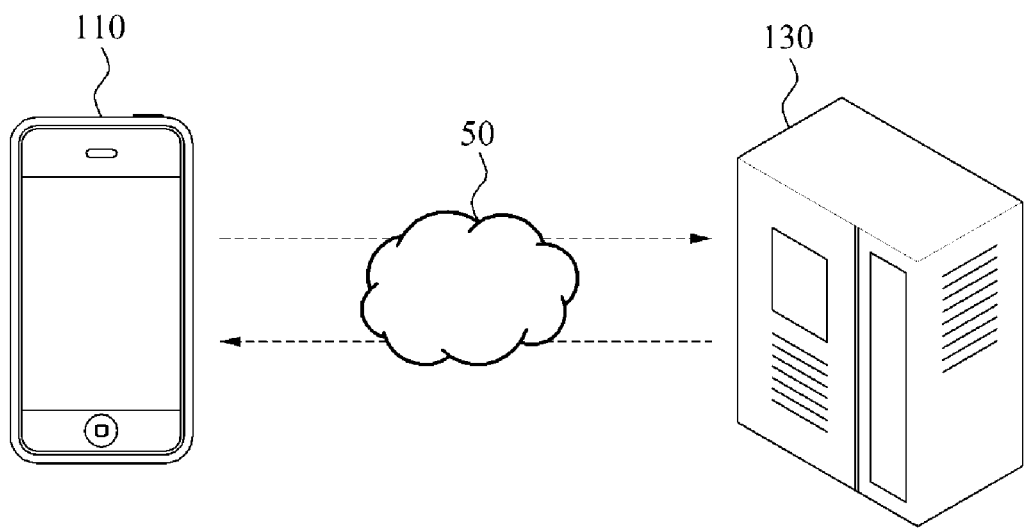
FIG. 1 is a diagram illustrating an example of a system environment used to set an initial location of a user terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Hereinafter, the term "initial location" may refer to a location of a user terminal or a user, which is initially-estimated to provide a localization service with respect to the user terminal or the user. For example, the initial location may be construed as a location of the user terminal or the user, which is found when the user initially executes a localization method and/or an application providing a localization service. In addition, the term "candidate initial location" may be construed as a candidate initial location or a candidate initial location group, which may be found as an initial location of the user terminal through the localization method and/or the application providing the localization service.

FIG. 1 is a diagram illustrating an example of a system environment used to set an initial location of a user terminal. Referring to FIG. 1, the system environment includes a wired/wireless network 50 including the Internet, a user terminal 110, and a server 130. The user terminal 110 and the server 130 exchange information with each other over the wired/wireless network 50.

The user terminal 110 may include one or more examples of an integrated wired/wireless terminal or a wireless terminal, such as a laptop, a personal digital assistant (PDA), a plasma display panel (PDP), a tablet computer, a mobile terminal including, for example, a smartphone and/or a feature phone, and other terminals known to one of ordinary skill in the art. The user terminal 110 may include one or more examples of sensors, such as a magnetometer, a magnetic field sensor, and an inertial measurement unit (IMU) sensor, and other sensors known to one or ordinary skill in the art. The user terminal 110 measures a magnetic field at a current location of the user terminal 110.

The user terminal 110 may include a localization method and/or an application providing the localization method that estimate the current location of the user terminal 110 based on the measured magnetic field. The user terminal 110 includes a processing power sufficient to execute the localization method and/or the application. The application may be downloaded from the server 130, and/or obtained through other routes, and may be installed on the user terminal 110.

In addition, the user terminal 110 stores, in a memory, a magnetic field map or a map of an area or a region in which the user terminal 110 may be positioned. The magnetic field map or the map may be obtained through communication with the server 130.

The server 130 may perform a wired communication, a wireless communication, and an integrated wired/wireless communication. The server 130 may store a magnetic field map or a map of an area or a region in which a service with respect to the user terminal 110 is provided. Accordingly, the server 130 may provide, to the user terminal 110, the magnetic map or the map in response to a request received from the user terminal 110, and may adjust the magnetic map or the map based on information including the measured magnetic field that is received from the user terminal 110.

The magnetic field map includes magnetic fields measured in advance at locations in an area or a region of a predetermined range, for example, an area or a region in which the current location of the user terminal 110 is to be estimated. The locations may be spaced at predetermined distances, and may include places at which a magnetic field may be measured and/or places that the user terminal 110 may reach.

Further, the locations may be in a three-dimensional (3D) space, as opposed to a two-dimensional (2D) plane. For example, the user terminal 110 may estimate an indoor location of the user terminal 110, for example, a location inside a high-rise building. To do so, the user terminal 110 may measure a magnetic field on each floor of the high-rise building, for example, at a fixed position on each floor of the high-rise building so that all positions are viewed to be identical on a 2D floor plan. Although all the positions are viewed to be identical on the 2D floor plan, altitudes of the positions differ from one another in a 3D space. Accordingly, magnetic fields measured on respective floors may differ from one another.

Figure 2:
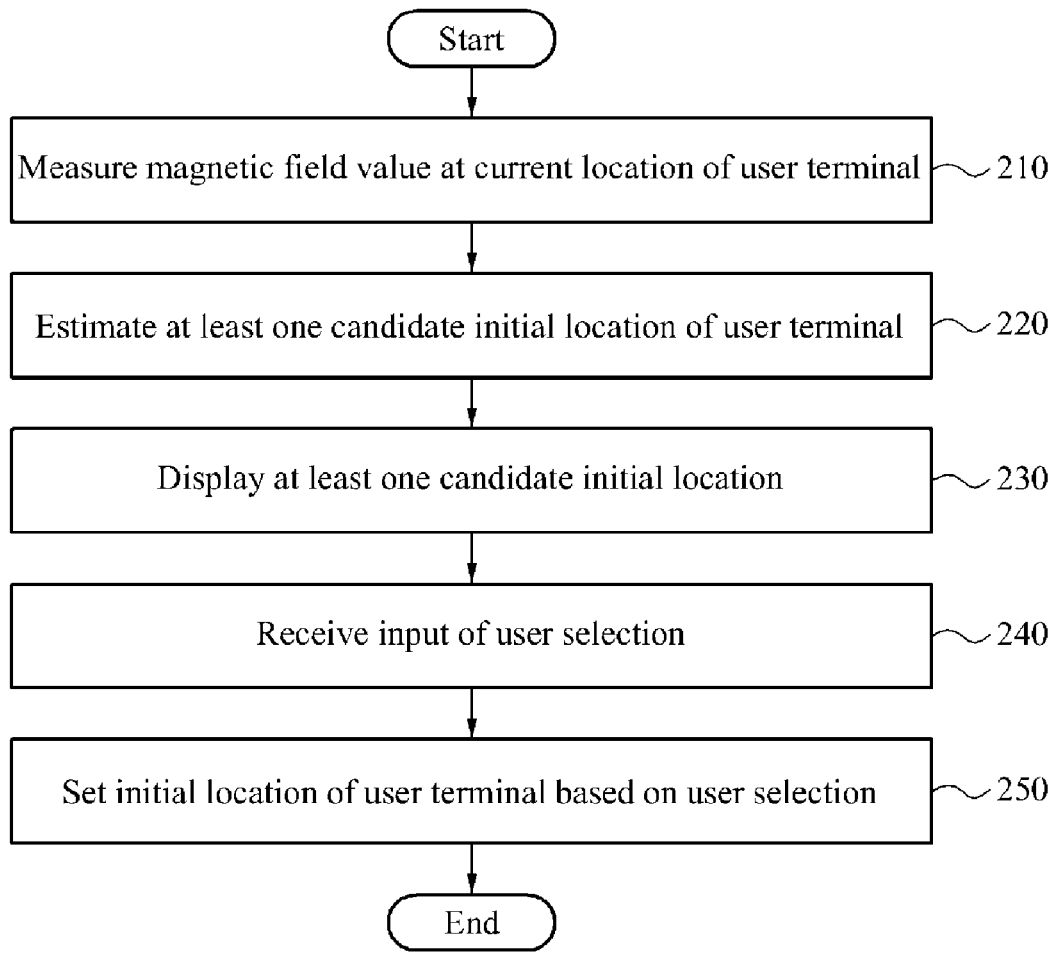
FIG. 2 is a flowchart illustrating an example of a method of setting an initial location of a user terminal.

FIG. 2 is a flowchart illustrating an example of a method of setting an initial location of a user terminal. Referring to FIG. 2, in operation 210, the user terminal measures a magnetic field value at a current location of the user terminal. For example, the user terminal may measure the magnetic field at the current location of the user terminal, using a magnetometer, a magnetic field sensor, and/or other sensors known to one of ordinary skill in the art.

In operation 220, the user terminal estimates at least one candidate initial location of the user terminal based on the measured magnetic field. The user terminal estimates the at least one candidate initial location of the user terminal to be at least one location corresponding to at least one magnetic field on a magnetic field map that is most approximate to the measured magnetic field. For example, the user terminal may compare a magnetic field (x, y, z) measured at the current location of the user terminal, to a magnetic field (x, y, z) on the magnetic field map, and may estimate a location on the magnetic field map that corresponds to a magnetic field (x, y, z) most approximate to the measured magnetic field (x, y, z), to be the candidate initial location of the user terminal. For example, if the user terminal measures a magnetic field of 5 at the current location of the user terminal, the user terminal may estimate a location on the magnetic field map that corresponds to a magnetic field of 5, or a magnetic field most approximate to 5, to be the candidate initial location of the user terminal.

Figure 4:
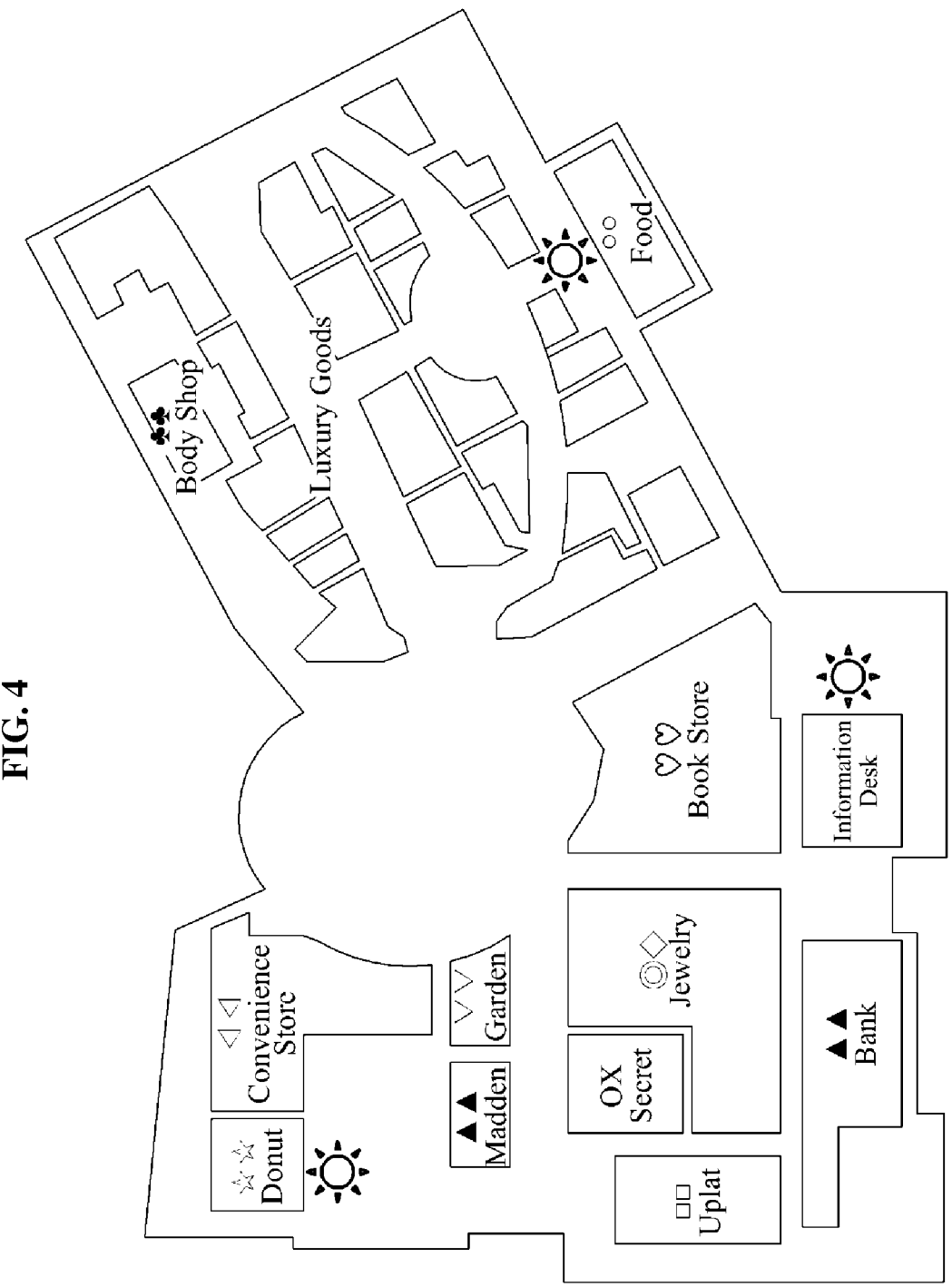
FIG. 4 is a diagram illustrating an example of a screen displaying candidate initial locations of a user terminal that are estimated using a method of setting an initial location of the user terminal.

In operation 230, the user terminal displays the at least one candidate initial location estimated. The user terminal may display, on a map on a screen, the at least one candidate initial location of the user terminal, as shown in FIG. 4.

In operation 240, the user terminal receives an input of a user selection of one of the at least one candidate initial location displayed. The user terminal may receive, via the map on the screen, the input of the user selection of one of the at least one candidate initial location displayed.

In operation 250, the user terminal sets the initial location of the user terminal based on the user selection received, i.e., to the selected one of the at least one candidate initial location.

Figure 3:
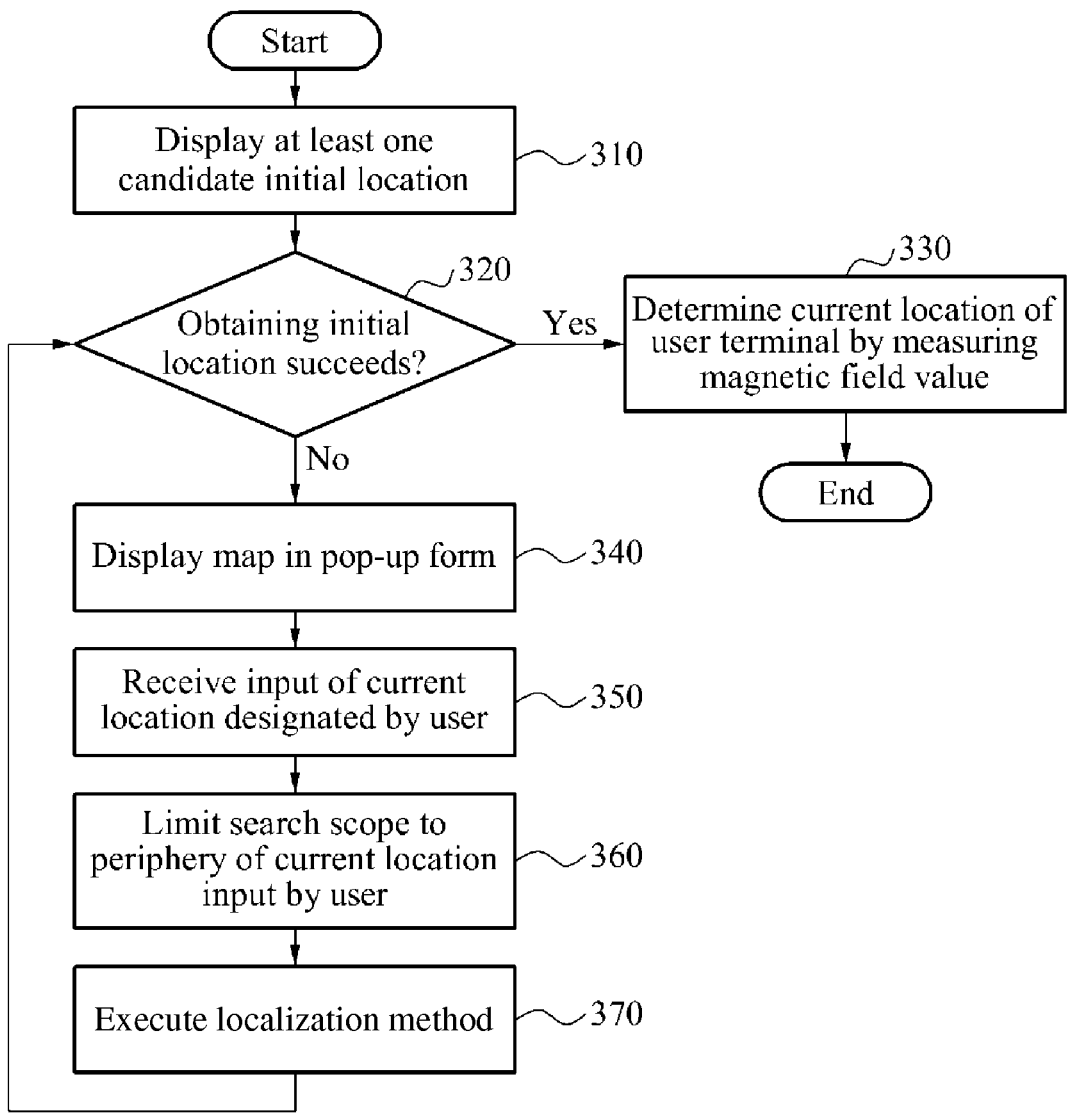
FIG. 3 is a flowchart illustrating another example of a method of setting an initial location of a user terminal.

FIG. 3 is a flowchart illustrating another example of a method of setting an initial location of a user terminal. Referring to FIG. 3, in operation 310, the user terminal displays at least one candidate initial location of the user terminal that is estimated. The user terminal may estimate the at least one candidate initial location of the user terminal based on a magnetic field measured at a current location of the user terminal. The user terminal may display, on a map on a screen, the at least one candidate initial location of the user terminal, as shown in FIG. 4.

In operation 320, the user terminal may determine whether obtaining the initial location succeeds, based on whether the user terminal receives an input of a user selection of one of the at least one candidate initial location displayed within a predetermined time. If the obtaining of the initial location succeeds (i.e., the user terminal receives the input of the user selection of one of the at least one candidate initial location displayed within the predetermined time), the method continues in operation 330. Otherwise, the method continues in operation 340.

In another example of operation 320, the user terminal may determine whether the obtaining of the initial location succeeds, further based on whether the user terminal receives a user input indicating that a candidate initial location corresponding to the current location of the user terminal is absent among the at least one candidate initial location displayed. If the obtaining of the initial location succeeds, the method continues in operation 330. Otherwise (i.e., the user terminal receives the user input indicating that a candidate initial location corresponding to the current location of the user terminal is absent among the at least one candidate initial location displayed), the method continues in operation 340.

In operation 330, the user terminal may set the initial location of the user terminal based on the user selection received, i.e., to the selected one of the at least one candidate initial location. The user terminal further determines the current location of the user terminal by measuring a magnetic field value based on the set initial location of the user terminal.

In operation 340, the user terminal displays a map in a pop-up form. In addition, the user terminal may also display other menus in, for example, a pop-up form and/or other forms known to one of ordinary skill in the art. The map is used to receive an input of the current location of the user terminal that is designated by the user on the map. The map may include an area or a region including the current location of the user terminal verified through, for example, wireless fidelity (WiFi) and/or other communication systems known to one or ordinary skill in the art.

In operation 350, the user terminal receives the input of the current location designated by the user on the map.

In operation 360, the user terminal limits a search scope to a periphery of the current location input by the user. That is, the user terminal adjusts the search scope used to set the initial location of the user terminal, based on the current location designated by the user.

In operation 370, the user terminal executes a localization method based on the limited search scope, in order to obtain the initial location. In more detail, the user terminal may reset a parameter of the localization method that estimates the initial location of the user terminal on a magnetic field map, based on the limited search scope. The localization method may estimate the initial location of the user terminal, using a magnetic field map, and may include one or more examples of methods, such as a Kalman filter, a particle filter, a Markov localization, and other methods known to one of ordinary skill in the art. In addition, the parameter of the localization method may refer to a variable used to estimate or calculate the initial location of the user terminal in the localization method, and may include one or more examples of variables, such as a filter coefficient of the Kalman filter, a filter coefficient of the particle filter, and/or other variables known to one of ordinary skill in the art.

In another example of operation 370, the user terminal may reset the parameter of the localization method, using a gyroscopic method of changing a variance in noise or a Gaussian variance that assigns weights to particles in the particle filter based on the current location input by the user and the measured magnetic field. Noise with respect to the magnetic field measured by the user terminal may vary depending on a point in time at which the magnetic field is measured, due to a change in a peripheral environment. Accordingly, by resetting the parameter of the localization method based on the current location input by the user and the measured magnetic field, an accuracy of the magnetic field map may increase, and the current location of the user terminal may be verified more precisely.

The user terminal returns to operation 320 to determine whether the obtaining of the initial location succeeds, e.g., whether the obtaining of the initial location based on the localization method succeeds. In another example of operation 330, the user terminal may set the initial location of the user terminal to the current location designated by the user, and/or the initial location obtained by the localization method.

FIG. 4 is a diagram illustrating an example of a screen displaying candidate initial locations of a user terminal that are estimated using a method of setting an initial location of the user terminal. Referring to FIG. 4, the screen displays the estimated candidate initial locations of the user terminal on a map of a shopping mall.

When a region, in which a localization service of a user terminal is provided, is relatively large, and an ambiguity of a magnetic field on a magnetic field map of the region is relatively great, the user terminal may estimate a plurality of candidate initial locations that may be a current location of a user or the user terminal. Accordingly, a screen may display, to the user, the plurality of candidate initial locations, as shown in FIG. 4, so that the user may select an initial location among the plurality of candidate initial locations that is closest to the current location. If the initial location is absent, the user terminal may display a map in a pop-up form to be used to receive an input of the current location designated by the user on the map, and may receive the input of the current location designated by the user on the map.

Referring again to FIG. 4, the map of the shopping mall displays a brand symbol (e.g., ☆ ☆) and a brand name (e.g., Donut) of each store. The user may select an initial location among the candidate initial locations that is closest to a current location of the user or the user terminal. The candidate initial locations are estimated to be three places marked with ✻ namely, "☆ ☆ Donut", "information desk", and "O O Food". The user may select a mark of a candidate initial location among the marks of the candidate initial locations that is closest to the current location. If the user selects a mark of a candidate initial location, the user terminal may measure a magnetic field based on the candidate initial location, and may determine the current location based on the measured magnetic field.

If a region, in which a localization service of a user terminal is provided, corresponds to an airport, a map of the region may display, for example, a section number, a gate number, an airline name, and/or other map elements known to one of ordinary skill in the art. If the region corresponds to a conference hall or an exhibition hall, a map of the region may display, for example, a booth name, a section name, a meeting room number, and/or other map elements known to one of ordinary skill in the art.

Figure 5:
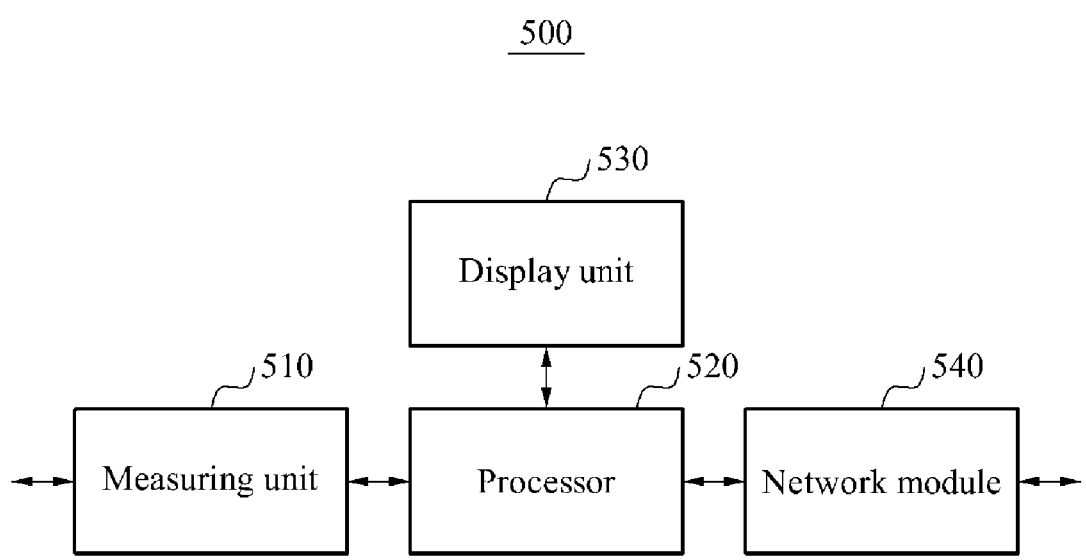
FIG. 5 is a block diagram illustrating an example of a user terminal that sets an initial location of the user terminal.

FIG. 5 is a block diagram illustrating an example of a user terminal 500 that sets an initial location of the user terminal. Referring to FIG. 5, the user terminal 500 includes a measuring unit 510, a processor 520, a display unit 530, and a network module 540.

The measuring unit 510 measures a magnetic field at a current location of the user terminal 500.

The processor 520 estimates at least one candidate initial location of the user terminal 500 based on the measured magnetic field value. The processor 520 estimates the at least one candidate initial location of the user terminal 500 to be at least one location corresponding to at least one magnetic field on a magnetic field map that is most approximate to the measured magnetic field.

The display unit 530 displays the at least one candidate initial location estimated, and may receive an input of a user selection of one of the at least one candidate initial location displayed. The display unit 530 may display, on a map on a screen, the at least one candidate initial location estimated. The display unit 530 may include, by way of example, a touchscreen that may display predetermined contents for the user, and simultaneously receive an input of a user selection with respect to the displayed contents. The processor 520 may set the initial location of the user terminal 500 based on the user selection received, i.e., to the selected one of the at least one candidate initial location.

In addition, the display unit 530 may display a map in a form of a pop-up if the display unit 530 fails to receive the input of the user selection of one of the at least one candidate initial location displayed within a predetermined time, or if the display unit 530 receives a user input indicating that a candidate initial location corresponding to the current location of the user terminal 500 is absent among the at least one candidate initial location displayed. The display unit 530 may further receive an input of the current location designated by the user on the map. The processor 520 may set the initial location of the user terminal 500 to the current location designated by the user.

In addition, the processor 520 may adjust a search scope to a periphery of the current location input by the user, and may execute a localization method based on the limited search scope, in order to obtain the initial location. The processor 520 may set the initial location of the user terminal 500 to the initial location obtained by the localization method.

In addition, the processor 520 may determine the current location of the user terminal 500 by measuring a magnetic field again based on the set initial location of the user terminal 500.

The network module 540 may download an application that sets the initial location from the server 130 of FIG. 1, or may receive the application via other routes. In addition, the network module 540 may receive a map or a magnetic field map through communication with the server 130, and may transfer, to the server 130, the set initial location and/or the determined current location of the user terminal 500.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, that independently or collectively instructs or configures the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of setting an initial location of a user terminal, the method comprising: measuring a magnetic field at a current location of the user terminal using at least of one of a magnetometer, a magnetic field sensor, and an inertial measurement unit (IMU) sensor; estimating an initial location of the user terminal based on the magnetic field; displaying on a display of the user terminal to a user the plurality of candidate initial locations responsive to a determined initial location ambiguity; selecting the one of the plurality of candidate initial locations; and setting the initial location based on both measured magnetic field and the selection of candidate initial location to thereby resolve locational ambiguity.

2. The method of claim 1, further comprising:
receiving, from a user, the selection.

3. The method of claim 1, further comprising:
displaying a map to be used to receive the current location from the user if an input indicating that a candidate initial location corresponding to the current location fails to be displayed is received from a user.

4. The method of claim 1, further comprising:
displaying a map to be used to receive the current location from the user if the selection fails to be received from a user within a predetermined time.

5. The method of claim 4, further comprising:
receiving the current location designated by the user on the map.

6. The method of claim 5, further comprising:
setting the initial location to the designated current location.

7. The method of claim 5, further comprising:
limiting a search scope used to set the initial location, to a periphery of the designated current location.

8. The method of claim 1, further comprising:
displaying, on a map, the candidate initial location.

9. The method of claim 1, further comprising:
estimating the candidate initial location to be a location corresponding to a magnetic field on a magnetic field map that is most approximate to the measured magnetic field.

10. The method of claim 1, further comprising:
determining whether obtaining the initial location succeeds based on whether the selection is received from a user within a predetermined time, or whether an input indicating that a candidate initial location corresponding to the current location fails to be displayed is received from the user.

11. The method of claim 1, further comprising:
determining the current location by measuring a magnetic field based on the initial location.

12. A non-transitory computer-readable storage medium storing a program comprising instructions to cause a computer to perform the method of claim 1.

13. A user terminal comprising: a measuring unit configured to measure a magnetic field at a current location of the user terminal using at least of one of a magnetometer, a magnetic field sensor, and an inertial measurement unit (IMU) sensor; a processor configured to estimate an initial location of the user terminal based on the magnetic field; and a display unit configured to display a plurality of candidate initial locations responsive to a determined initial location ambiguity, wherein the processor is further configured to select one of the plurality of candidate initial locations, and set the initial location based on the selection of candidate initial location to thereby resolve locational ambiguity.

14. The user terminal of claim 13, wherein the display unit is further configured to:
receive, from a user, the selection.

15. The user terminal of claim 13, wherein the display unit is further configured to:
display a map to be used to receive the current location from the user if the selection fails to be received from a user within a predetermined time, or if an input indicating that a candidate initial location corresponding to the current location fails to be displayed is received from the user.

16. The user terminal of claim 15, wherein the display unit is further configured to:
receive the current location designated by the user on the map.

17. The user terminal of claim 16, wherein the processor is further configured to:
set the initial location to the designated current location.

18. The user terminal of claim 16, wherein the processor is further configured to:
limit a search scope used to set the initial location, to a periphery of the designated current location.

19. The user terminal of claim 13, wherein the processor is further configured to:
estimate the candidate initial location to be a location corresponding to a magnetic field on a magnetic field map that is most approximate to the measured magnetic field.

20. The user terminal of claim 13, wherein the processor is further configured to:
determine the current location by measuring a magnetic field based on the initial location.

\* \* \* \* \*